US008843233B2

(12) United States Patent
Dollens (10) Patent No.: US 8,843,233 B2
(45) Date of Patent: Sep. 23, 2014

(54) INTELLIGENT DRIVE CONTROL SYSTEM (76) Inventor: Donald L. Dollens, Grosse Pointe Shores, MI (US)

( * ) Notice: Subject to any disclaimer, the term of this patent is extended or adjusted under 35 U.S.C. 154(b) by 157 days.

(21) Appl. No.: 13/285,726

(22) Filed: Oct. 31, 2011

(65) Prior Publication Data
US 2012/0046846 A1 Feb. 23, 2012

Related U.S. Application Data (63) Continuation-in-part of application No. 11/725,662, filed on Mar. 20, 2007, now Pat. No. 8,050,795.

(51) Int. Cl.
G06F 7/00 (2006.01)
G05B 19/04 (2006.01)
G05B 15/00 (2006.01)
B60W 30/18 (2012.01)
B60K 7/00 (2006.01)
B60K 17/356 (2006.01)

(52) U.S. Cl.
CPC ........... *B60K 7/0007* (2013.01); *B60Y 2200/46* (2013.01); *B60W 2520/406* (2013.01); *G05B 2219/45054* (2013.01); *B60W 2520/403* (2013.01); *G05B 2219/41112* (2013.01); *B60W 30/18* (2013.01); *B60K 17/356* (2013.01); *B60W 30/18172* (2013.01); *B60Y 2300/18* (2013.01); *B60Y 2200/24* (2013.01); *B60W 2520/26* (2013.01)
USPC ........... 700/230; 700/214; 700/228; 700/250; 700/253; 700/261; 700/304; 700/213

(58) Field of Classification Search
None
See application file for complete search history.

(56) References Cited

U.S. PATENT DOCUMENTS

| 4,032,003 | A | | 6/1977 | Hull |
| 4,924,164 | A | | 5/1990 | Riley |
| 4,957,532 | A | | 9/1990 | Jacobson et al. |
| 5,004,094 | A | | 4/1991 | Brandt |
| 5,270,930 | A | * | 12/1993 | Ito et al. ........................ 701/69 |
| 5,689,161 | A | | 11/1997 | Fugere et al. |
| 6,065,583 | A | | 5/2000 | Hoashi et al. |
| 6,554,189 | B1 | | 4/2003 | Good et al. |
| 6,701,214 | B1 | | 3/2004 | Wielebski et al. |
| 6,873,882 | B2 | | 3/2005 | Tachibana et al. |
| 6,897,625 | B2 | | 5/2005 | Brixius et al. |
| 6,959,804 | B2 | | 11/2005 | Helgerson et al. |
| 7,007,807 | B1 | | 3/2006 | Stockard |

(Continued)

FOREIGN PATENT DOCUMENTS

GB 1524971 5/1975
GB 2185955 1/1987

OTHER PUBLICATIONS

International Search Report dated Jul. 22, 2008.

*Primary Examiner* — Yolanda Cumbess
(74) *Attorney, Agent, or Firm* — Rader Fishman & Grauer PLLC (57) ABSTRACT A drive control system for a moving device such as a vehicle uses a dynamic force vector program that is hosted by a computer on the vehicle. Variable controllers receive input from the computer that automatically adjusts drive and slave motors which in turn propel an associated drive member so as to maximize efficiency of the operation of the vehicle in various terrain conditions. Sensing devices provide continuous load and condition parameters to the computer that in turn adjusts the torque outputs for the variable controllers which in turn dynamically adjusts the vehicle's operation based on current operating conditions.

20 Claims, 6 Drawing Sheets

(56) References Cited

U.S. PATENT DOCUMENTS

| | | |
|---|---|---|
| 7,035,714 B2 | 4/2006 | Anderson et al. |
| 7,050,873 B1 | 5/2006 | Discenzo |
| 7,081,735 B1 | 7/2006 | Malkowski, Jr. et al. |
| 7,331,210 B2 | 2/2008 | Dietrich |
| 2001/0027909 A1 | 10/2001 | Itoh et al. |
| 2002/0111711 A1 | 8/2002 | Peshkin et al. |
| 2003/0116408 A1 | 6/2003 | Topmiller et al. |
| 2003/0148843 A1* | 8/2003 | Bowen ............... 475/5 |
| 2004/0134754 A1 | 7/2004 | Grafer et al. |
| 2004/0257022 A1* | 12/2004 | Trifilo ............ 318/625 |
| 2005/0283273 A1 | 12/2005 | Keras et al. |
| 2008/0234858 A1* | 9/2008 | Dollens ............ 700/230 |
| 2009/0001911 A1* | 1/2009 | Kayikci et al. ....... 318/254.1 |
| 2009/0043441 A1* | 2/2009 | Breed ............... 701/29 |
| 2010/0147609 A1* | 6/2010 | Gorgas et al. ....... 180/65.51 |

* cited by examiner

INTELLIGENT DRIVE CONTROL SYSTEM

CROSS-REFERENCES TO RELATED APPLICATIONS

This application is a continuation-in-part of U.S. patent application Ser. No. 11/725,662 filed on Mar. 20, 2007, and hereby incorporates such application in its entirety by reference.

FIELD OF THE INVENTION

A drive control system for use in connection with a vehicle, more specifically, an intelligent dynamic vehicle drive control system that employs a mathematical model to effectuate delivery of balanced power and speed control for a vehicle so as to maximize efficiency of the vehicle on the surface of a planet.

BACKGROUND AND SUMMARY OF THE INVENTION

It is well known to provide an electric vehicle that is powered by one or more electric motors to move the vehicle from place to place. In many instances, single electric drive motors are utilized to provide primary power which is delivered to the driven wheels by a series of mechanical devices including transmissions, differentials, drive shafts, and other components that have been employed since the automobile was introduced. In recent years, as the electric vehicle has become more commonplace, various drive system designs have been introduced as alternative methods of power delivery. However, such drive systems have inefficiencies, are complex, and traditionally do not account for environmental conditions while selectively controlling in real time each drive wheel.

An all-wheel-drive vehicle that includes a drive motor assembly at each wheel is a simple machine that has characteristics similar to any machine that is used to impart motion to a load or various loads. In the case of a vehicle, the load is only the vehicle itself as well as any additional weight of passenger(s) and any other items on board. Calculating the force required to move its mass at a given speed is a matter of applying the equation F=ma. While in the case of the conveyor, the mass being moved may be variable (given that the quantity of loads can vary) but the pathway is fixed. The combination of a fixed pathway and sensing devices defining parts of the pathway that represent various angles of load incline or decline make the vector part of the equation relatively easy to recognize. These angles are pre-defined and programmed into a "chain pull calculation".

In the case of the vehicle, the weight or mass is generally fixed during operation (once the weight of the additional passengers and carry-ons is determined), but the acceleration and speed and vector can be randomly variable depending on the pathway the driver takes. In essence, the same classic formula describing Newton's Second Law of Motion (F=ma) is applicable to both situations. The significant difference is that in the case of the conveyor, the mass can change constantly, and in the case of the vehicle, the acceleration and speed may be changed constantly. However, in both cases, the power needed to drive the machine is predictable and can be calculated. Thus, if a mathematical model of a machine's work requirement can be built, then the power needed to move the machine can be both predicted and applied with the use of the elements described herein.

The control method and architecture described herein is an improvement over currently available approaches to power application for electric vehicles. It provides a universally applicable method that will improve performance, efficiency, and stability in various forms of vehicle systems as well as other machinery whose purpose is to move material through a manufacturing facility or on the planet's surface. The problem however is that traditional vehicle drive systems do not compensate well under all terrain conditions for the changes in torque demand as the vehicle advances along the surface of the planet or in the manufacturing environment.

In the case of AWD electric vehicles, a novel approach to power application has been developed. A primary sensing device constantly measures the physical attitude of the vehicle (primary vector data) with a gyroscope or similar instrument. One or more gyroscopes may be used as sensing devices to determine the vector attitude of the vehicle along with the speed input requirement where appropriate to calculate the overall torque demand required to move the vehicle at the speed desired. In addition, as the vehicle moves through roadway inclines and declines, the center of gravity of the vehicle will shift about the vehicle in a manner that is able to be detected by the gyroscope and calculated then utilized to apply varying torque outputs to each wheel as needed. This is similar to the effect on torque requirements of each drive on a conveyor as loads pass from one drive purview to the next causing the relative torque demand among all drives to change substantially. The present invention overcomes both of these circumstances by delivering power as required based on accurate calculations of the torque needed while instantaneously adjusting for the same in real-time.

It would be desirable to provide an intelligent drive control system that improves upon the current method of overcoming the aforementioned problems. The preferred system should be dynamic and operable to constantly change performance output of every motor within the system, in view of the constantly changing loads on the system. It would also be desirable to provide a drive control system that improves the available technology such that torque demands on the drive system are anticipated and proactively met, speed requirements are maintained, and dynamic environmental conditions are taken into consideration.

It would also be desirable to provide an improved drive control system for a multi-drive system or AWD system that continuously senses the total mass of the vehicle and is able to determine the center of gravity of the vehicle as it travels over various terrain configurations. This information is continuously delivered to an on-board microprocessor, which in turn calculates optimal torque requirements for each wheel drive mechanism of the vehicle and then sends a corresponding signal back to a drive controller for producing the optimal torque output for each drive employed with the vehicle.

It would also be desirable to provide an improved drive control system that improves delivery of balanced power and speed control to a multi-drive vehicle system and an all-wheel-drive (AWD) electric vehicle. A mathematical model allows the control system to calculate and provide required total power delivery as well as balanced power delivery to each drive within the machine system such that each motor delivers its proportional share of the power needed. Due to the nature of many machine designs, including electric vehicles, it is common to expect that if a number of motors are utilized to share the total work load, there will be times when the work load will be unevenly distributed among drive motors. The present invention overcomes the problem that this uneven power demand imposes.

One aspect of the present drive control system is that it allows for the elimination of certain commonly used major mechanical components including transmissions, differentials, torque converters, drive shafts, and other ancillary coupling components saving related costs.

Another aspect of the present invention provides a drive control system for a vehicle comprising one or more variable speed and variable torque motors for driving a vehicle. A dynamic force vector calculation program is operable to continuously calculate the torque requirements for each motor in the system. One or more sensors are employed that are operable to create a signal indicative of load conditions and, if required, additional data including the weight of such load or loads, slippage of the wheels, and terrain characteristics, and then send data to a computer. The computer is operable to process the signals from the sensors using the dynamic force vector calculation program and in turn generates real time drive torque data for each motor. A variable drive controller is operable to control each variable speed motor within the system so that proper torque is generated by each motor as is required for optimum performance. The resulting intelligent drive control system is dynamic and continuously monitors torque requirements for each motor within the vehicle system given current load data and environmental conditions so as to maximize operating efficiency of the vehicle.

Further areas of applicability of the present invention will become apparent from the detailed description provided herein. It should be understood that the detailed description and specific examples, while indicating preferred embodiments of the present invention, are intended for purposes of illustration only, since various changes and modifications within the spirit and scope of the invention will become apparent to those skilled in the art from this detailed description. It will be appreciated that the present invention can be utilized in a variety of vehicle drive systems, and where it is desirable to efficiently transport people and materials in a variety of terrain conditions.

DETAILED DESCRIPTION OF THE PREFERRED EMBODIMENTS

Figure 1:
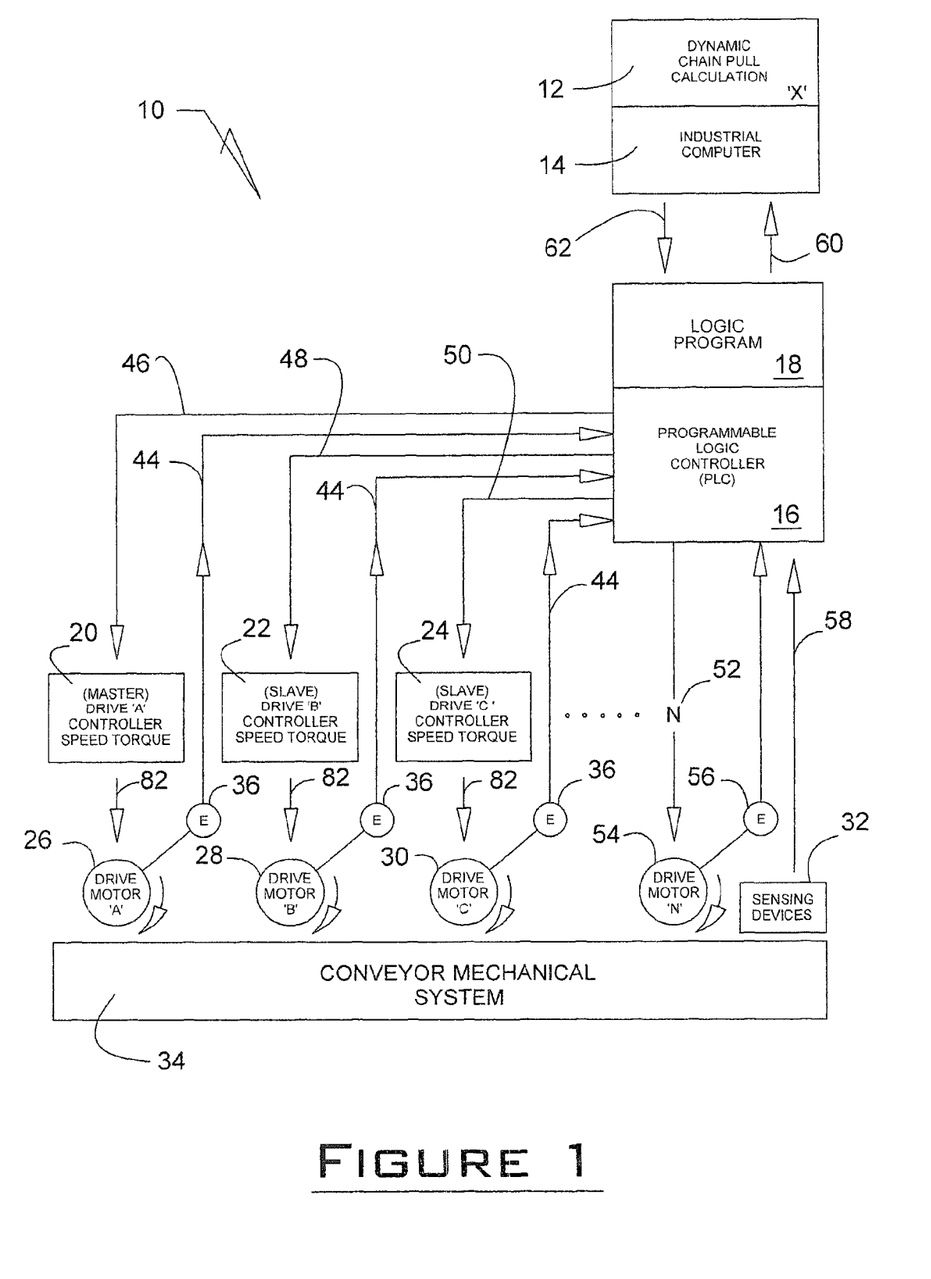
FIG. 1 illustrates a flow diagram for a conveyor drive control system.

A drive control system 10 is illustrated in FIG. 1 and includes a dynamic chain pull calculation computer software program 12, and industrial computer 14, a PLC 16 with software 18, a plurality of drive controllers 20, 22 and 24, a plurality of drive motors 26, 28 and 30 and sensing devices 32. The drive control system 10 is integrated with a conveyor 34 which includes typical components for moving work pieces throughout an assembly line. It will be appreciated that the present drive control system 10 can be utilized wherever it is desired to dynamically control the movement of material from place to place.

With continued reference to FIG. 1, an individual encoder 36 is placed in proximity to drive motors 26, 28 and 30 for counting and monitoring the links 38 that comprise a conveyor or chain 40. The conveyor chain can be in excess of the 2,000 ft. limitation that is typically ascribed to chain conveyor applications. Through utilization of the encoders 36, the specific number of chain links between drive motors can be constantly monitored and such data processed by the PLC 16. The rotational angle of all encoders is continually measured by increments and is returned to the control system via signal 44. These signals are compared to incremental measurements coming from other drive related encoders within the control system. The incoming incremental data is utilized to cause the control system to respond in such a way as to adjust the relative speed of each drive so that the number of chain links within the defined zone between drives remains constant. The synchronizing function of this system in this manner will assure that some amount of induced slack chain is maintained between all drive points.

The PLC 16 includes software 18 for converting the data from the sensing devices 32. This data in turn is processed by the industrial computer 14 so as to identify all carriers or loads transiting various predefined zones as well as the weight characteristics of each carrier and load on the conveyor 34. The logic software program 18 also processes the encoder data 44 that is conveyed to the PLC 16. The encoder data 44 would include, inter alia, the number of links counted as they exit the preceding zone and enter the succeeding zone of primary drive zones.

It will be appreciated that the PLC 16 itself can control the speed adjustments of the slave drive controllers 22 and 24 individually without the aid of the computer 14. Likewise, the present system could be configured to exclude the PLC 16 and instead have the computer 14 process and output the signals to three controllers 20, 22 and 24. Torque output signal 46 traverses from the PLC 16 to the master controller 20. A second torque requirement output signal 48 comes from controller 16 and is delivered to a slave drive controller 22. A third torque output signal 50 is communicated from controller 16 to another slave drive controller 24. It will be appreciated that the present drive control system 10, can include a plurality 52 of controllers, drive motors 54, and encoders 56 in communication with one another, as deemed necessary in order to make the conveyor system 34 operate properly. Thus, the control system 10 is flexible and can be adopted for application in large-scale conveyance situations employing conveyor lines well in excess of 2,000 feet. By contrast fewer controllers and motors can be used and the system 10 automatically adjusts for same.

The sensing devices 32 send signals 58 to the PLC 16. The signals 58 carry data identifying the load transitions of a work piece on the conveyor 34, zone location of a particular work piece on the conveyor 34, and other information such as if a work piece carrier is running empty, etc.

Once the program 18 associated with the PLC converts the data indicative of work piece zone location and weight of the work piece, that new data is then conveyed 60 to the industrial computer 14. The dynamic chain pull calculation program 12 then interprets and processes that new data so as to ascertain actual load and position characteristics for each drive motor. That information in turn is then compared to the real time current speed and torque requirements of each individual drive motor 26, 28 and 30, in order to ascertain whether each is operating efficiently. In turn, signals 62 are generated from the industrial computer 14, to the PLC 16 and its program 18 which in turn segments the signal 62 into its constituent parts. In turn, signals 46, 48 and 50 are then generated by the PLC 16, to their corresponding controller 20, 22 and 24, which is indicative of how each motor 26, 28 and 30 should be performing. For example, if it is found that slave motor 30 is lagging, which is when the torque output is not equal to the calculated torque demand, then PLC 16 would send a signal 50 to controller 24 that is indicative of the need to increase power to drive motor 30.

Thus, a dynamic drive control system 10 is operable so as to allow the overall system to dynamically adjust given current load characteristics on the conveyor system 34. Through the use of the dynamic chain pull calculation 12, constant information is sent via sensing devices 32, through PLC 16, which continuously monitors and updates the current performance characteristics of the conveyor system 34 to the computer 14. In turn, feedback information via signal 62 automatically adjusts the performance of the motors 26, 28 and 30 to a desired level.

Figure 2:
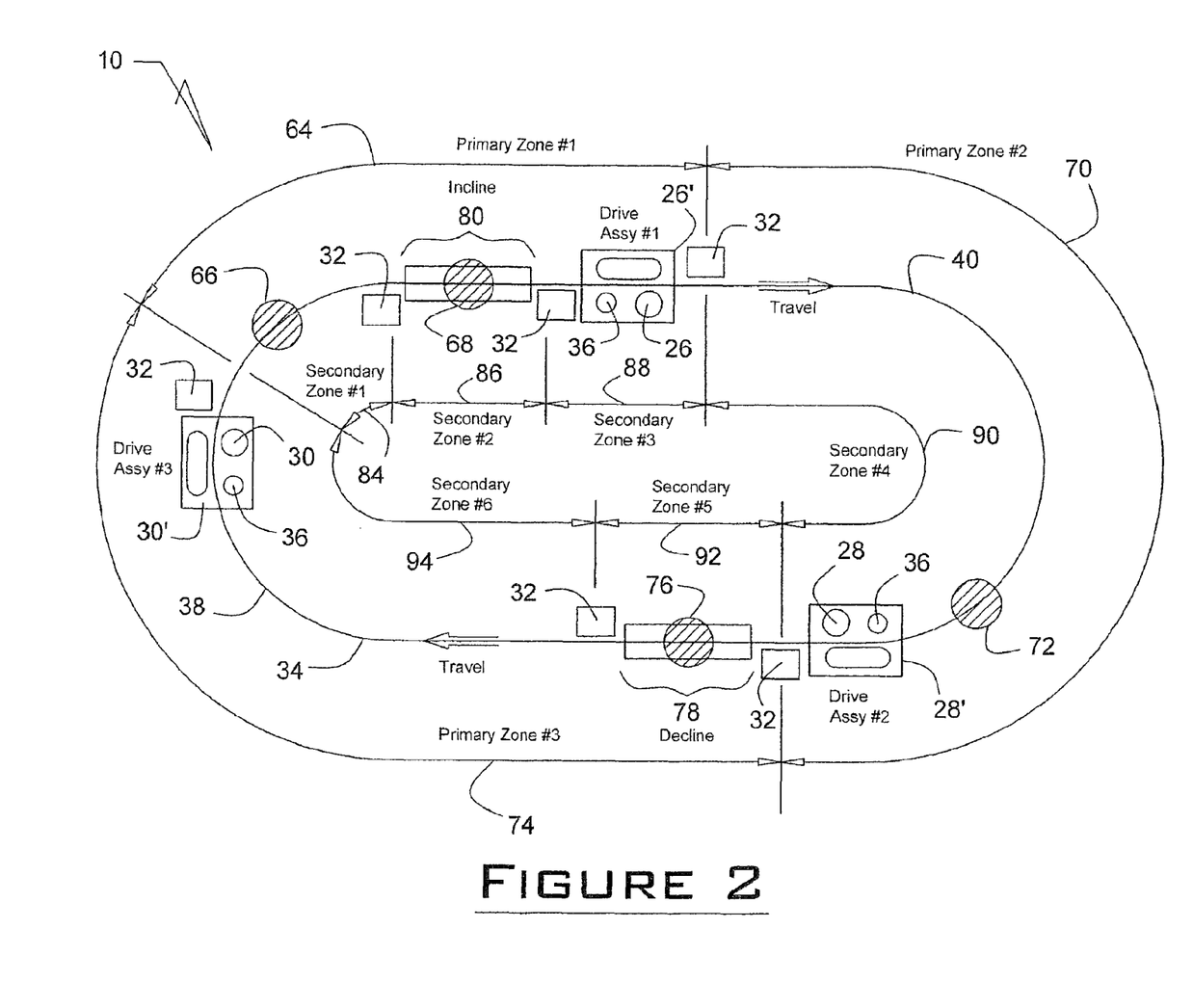
FIG. 2 is a plan view that schematically illustrates components of a drive control system.

With reference to FIG. 2, a schematic diagram is illustrated of the plan view of the novel conveyor system 10. The system 10 is divided into three primary zones 64, 70, and 74, the extent of which are defined, in part, by the drive assemblies 26, 28, and 30. Each primary zone consists of the chain path between the drive assemblies located at the head and tail of said zone. The drive assembly at the tail of any primary zone is by definition the head of the preceding zone. The loads 66, 68, 72, and 76 represent a single load in progressive positions as the load traverses the conveyor system. Encoders 36 are located at each drive assembly and may serve two functions. One function is to provide a speed feedback reference to the drive control system to maintain programmed and synchronized speed among all active drives. A second function is to provide a means to count passing chain links at each drive assembly. This information is used by the control system to maintain constant link counts necessary to assure the calculated chain slack in each succeeding primary zone. Within each zone, the system 10 via program 12 is programmed to include a target number of chain links for optimal performance. When the system 10 determines that the preset target number of links are not the same as the actual number of links in a given zone, then the dynamic control system 10 is intelligent and will automatically adjust, via drive controllers 20, 22 and 24, the speed of the corresponding motors 26, 28 and 30 so as to reconfigure the system so that the target number of links can be obtained so as to maximize optimal performance. By doing so, the stress upon the links within each given zone, is minimized and chain tension is relieved which will increase conveyor chain life and allow for the application of increased chain lengths for all similar systems.

First primary zone 64 includes the portion of the conveyor between first drive assembly 26' and third drive assembly 30. Sensors 32 are located at the entry and exit of each primary zone 64, 70, and 74 and are also located at the entry and exit of all other secondary zones 84, 86, 88, 90, 92 and 94 for the purpose of tracking the loads while within each zone. First primary zone 64 is shown with the master drive 26, its encoder 36, and sensing devices 32, located at the extremities of the zone. As the load 66, enters Primary Zone #1, its presence is detected by the first set of sensors 32 notifying the PLC 16 that the load has entered the area of the chain path under the control of first drive assembly 26' and has exited the control zone of drive assembly number 36'. The load transition is recognized by the computer 14 and the torque output of each drive is modified accordingly. As the same load 68, passes into the secondary zone 86 defined by the beginning of the inclined vertical bend 80, the industrial computer 14 recognizes that the load is now traversing up the incline. The torque demand on the first drive assembly 26' is increased based upon the lift angle and weight of the load as is recognized through preprogramming into the computer 14 and thus the torque is further increased to compensate for this demand. Note that the load weight and incline angle are pre-determined and calculated in the overall system chain pull calculation programmed in the computer 14. It should also be noted that a plurality of secondary zones 84, 86, 88, 90, 92, and 94, within the primary drive assembly zones may exist bounded by sensing devices to monitor general load locations within the specified zones as they traverse the conveyor system. In addition, it should be noted that a "load sensing" secondary zone may shift between the drive control purviews of succeeding primary drive zone controllers in some instances where overhauling load conditions exist (declines with drive assemblies upstream). For example, when a load is traversing down decline 78, it may be "held back" by the second drive assembly 28'. When there is no load on this decline 78, which is also secondary zone 92, this section of chain may be pulled by the third drive assembly 30' if conditions warrant.

A second primary zone 70 includes that portion of the conveyor system 34 having its own set of sensors 32, a third load position 72, slave motor 28 and an associated encoder 36. It will be appreciated that the sensors 32 can be of the proximity type or any other device that is commercially available and commonly used for these purposes on material handling systems. Other types of sensors may be employed as desired.

A third zone 74 is provided and it describes a fourth load position 76, sensors 32, and a slave drive motor 30 with its associated encoder 36. It will be appreciated that the conveyor system 34 can be broken down into as many zones as necessary to monitor and control the drive control system 10. The purpose of which is to provide segments of the conveyor system that employ its own motor and encoder which provides continuous feedback to the computing system of the drive control system 10. Such arrangement allows the constant monitoring of loads moving within and between secondary "load sensing" zones as well as monitoring the number of chain links within each zone so as to optimize performance. The PLC 16 and industrial computer 14 are operable to process the signals from the encoders so as to compare the targeted preferred number of chain links within a given zone, to the actual number of links within a given zone. In turn, the PLC 16 responds by adjusting the controllers 20, 22 and 24 respectively.

Figure 3:
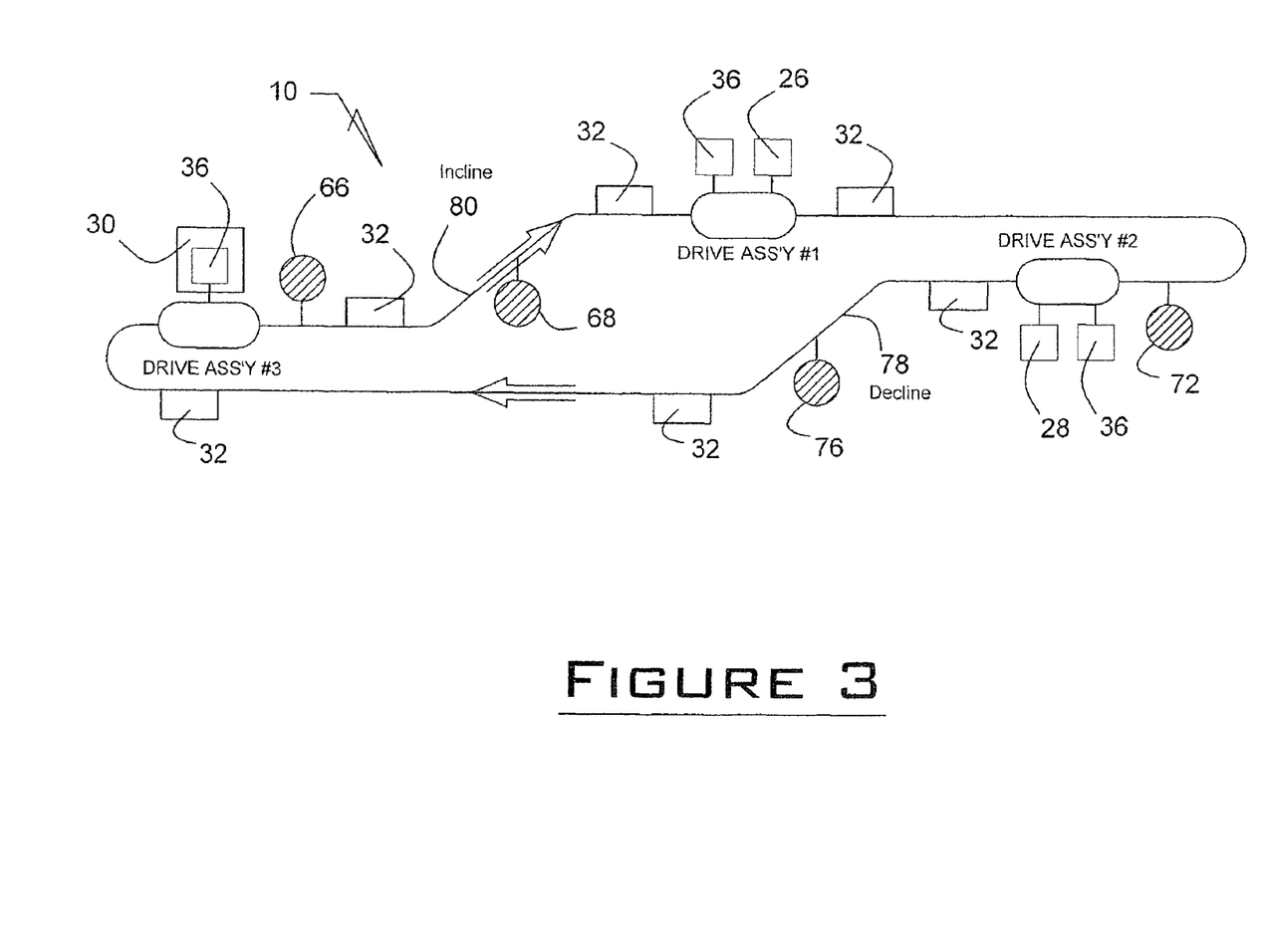
FIG. 3 is a schematic representation of a side view of the drive control system for a conveyor.

With reference to FIG. 3, a side elevation view of the schematic representation illustrating how a workload traverses through a plant is depicted. For example, drive motor 26 propels a load 66 along a flat, continuous path until it reaches an inclined vertical bend 80. When at position 68, the load is shown traveling up the incline 80, which generates increased torque demand on the conveyor system 34. In turn, drive motor 26 will automatically adjust to increase its torque output. This, in part, is done through the aid of a dynamic chain pull calculation program 12 which is capable of aiding the system in automatically adjusting to the overall system current torque needs.

Conversely, as the load 76 traverses back down a decline 78, the motors in the system will automatically adjust to accommodate same. It will be appreciated that the sensors 32 positioned around the conveyor line will automatically sense load transitions into and out of primary zones and various other defined secondary zones within each drive zone positions and their associated weights, with said data being then directed via signal 58 to the PLC 16 as shown in FIG. 1.

A description of the operation of the drive control system 10 will now be presented. With reference to FIGS. 1 and 2, one aspect of the preferred embodiment of the present invention includes one or more loads 66 being placed on a conveyor chain 40. It will be appreciated that the length of the chain can be in excess of 2,000 ft. because of the unique design herein. The conveyor system 34 can move a single load, or a plurality of loads throughout the system, at any given time. As load 66 traverses within the first primary zone 64, the sensor 32 will automatically detect its position. The control system will recognize this condition as well as the load weight thus sending a signal 44 to the PLC 16. That data is processed by the logic program 18 which in turn converts the information to a signal 60 which is then delivered to the industrial computer 14. The dynamic chain pull calculation program 12 in turn processes the real time signal 60 and makes a comparison to a preferred or bench mark performance indicia x. A delta will now be recognized indicating the difference between the actual performance and the preferred bench mark performance x. The dynamic chain pull calculation program 12 processes this condition and automatically adjusts performance of the system to make it closer to the benchmark performance level. This is accomplished by the industrial computer producing the signal 62 which is indicative of the drive torque requirements for the master drive motor 26, and for the other associated slave motors. The PLC 16 differentiates the signal 62 into select torque output requirements 46, 48 and 50 which in turn informs the controllers 20, 22 and 24 the desired torque levels. Drive motors 26, 28 and 30 in turn receive signals 82 commensurate with the desired performance automatically performed at the desired level. Thereafter, the drive motors impart motion to the drive chain 40 so that material advances throughout a plant in a smooth and consistent manner.

It will be appreciated that more than three controllers and motors can be slaved to the PLC 16. For example, a number up to "N" 52 can be integrated within the system and will allow for chain lengths of greater than 2,000 ft. It will also be appreciated that each associated controller 52 will have its own drive motor 54 and encoder 56 the combination of which become part of their own zone within the conveyor 34.

Through this unique conveyor drive control system 10, the drive motors 28, 30, or 54 can be removed for maintenance, or other purposes, while in operation and when this condition is detected the other associated motors within the system 10, will automatically adjust under dynamic conditions and increase their performance as to accommodate for the missing motor. Further, the master drive motor 26 could be taken out of service and one of the slave drive motors 28, 30, etc., could be designated, either manually or automatically, as the new master drive. Likewise, the former master drive 26 could be designated as a slave drive as desired when it is brought back into service. Thus, the drive control system is flexible in that slave and master motors can be interchanged and the computer 14 or PLC 16 may operate to control or effectuate said changes.

Another aspect of the operation of the present invention includes monitoring the number of chain links within a given zone as discussed above. This is accomplished by the associated encoders 36 counting the number of links 38 within the chain 40 as they traverse past their associated motor. Prior to operation, the computer 14 will have been programmed to a predetermined desired number of links within each given zone. This creates the base line for which the computer to compare whether or not the target number of links is appropriate within a given zone. As the system operates, the data produced by the chain and carrier movement will be delivered to the computer 14 which will recognize any discrepancy and automatically adjust the signal 62 back to the PLC 16. The associated controllers 20, 22 and 24 will automatically adjust the speed of their associated drive motors so as to re-sync the system. The goal is to get back towards the target number of links within a given zone and produce a calculated level of slack chain. Such should reduce the stress on the links 38 within the chain 40 which in turn will increase longevity of the chain 40. This in turn reduces operating costs and enhances efficiency. It should be noted that the calculated level of slack chain would be a minimal amount such that subsequent chain telescoping would not cause the system to jam.

It should be noted that this invention is applicable to conveyor systems with single drive control units which may be utilized to carry or deliver loads of various different weights at different time periods. This data (load weight) may be manually or automatically input as the carrier is loaded and the torque control will automatically adjust to the torque demand as required.

Figure 4:
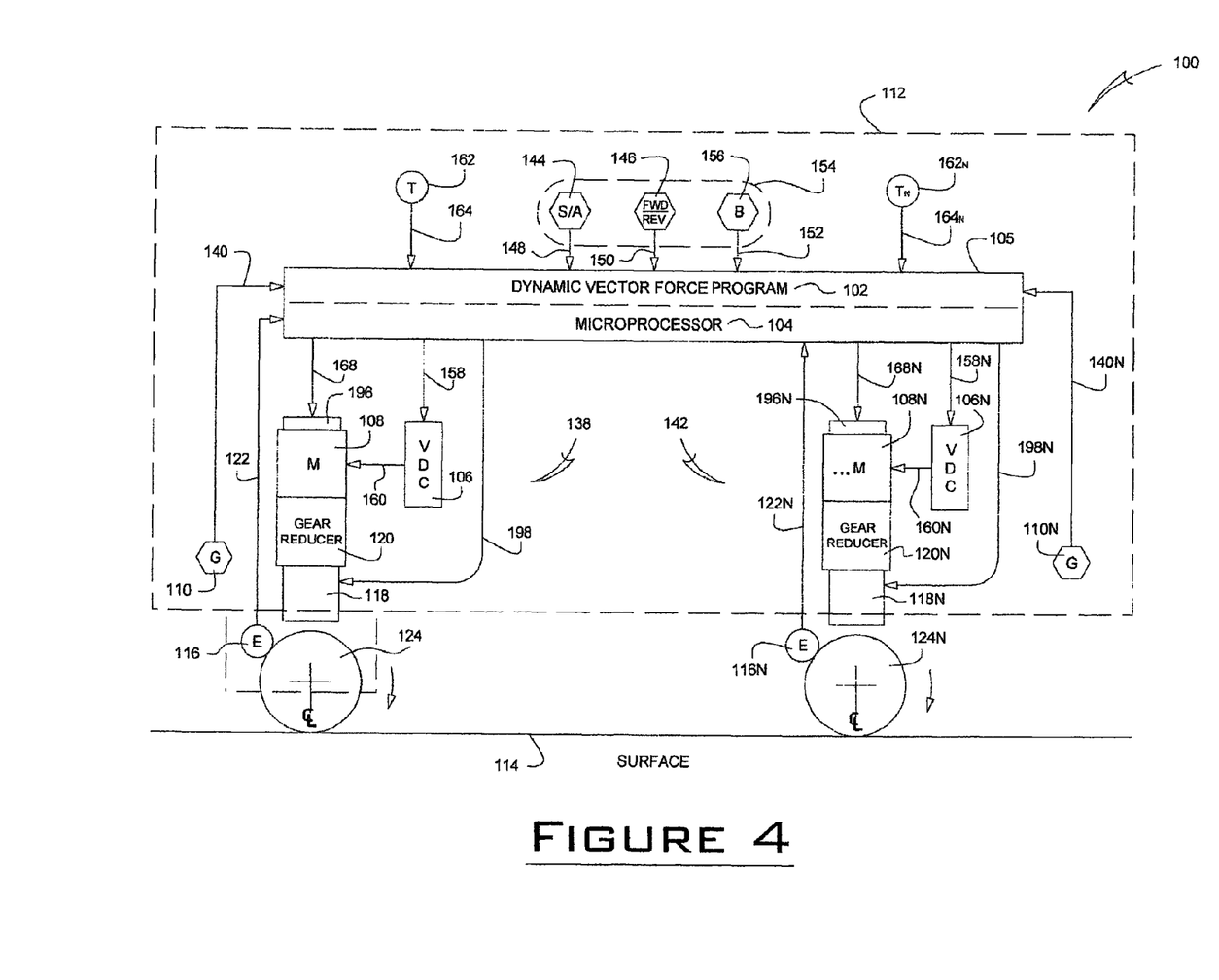
FIG. 4 illustrates a logic and mechanical flow diagram for an electric vehicle intelligent drive control system.
Figure 5:
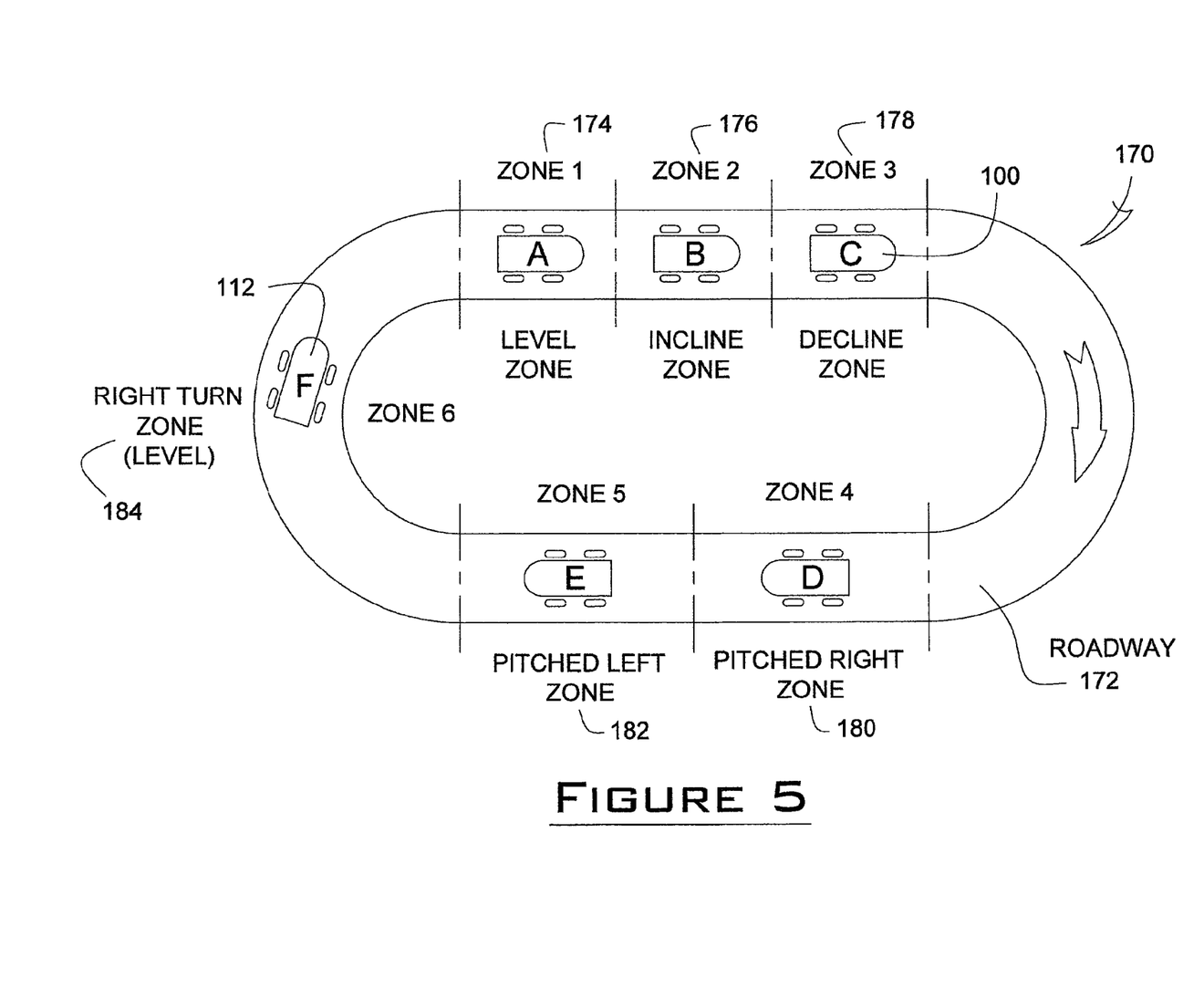
FIG. 5 is a plan view of an example roadway divided into six zones; each separate zone is an example of a specific roadway terrain variations which, when traversed, represent a unique example of torque demand on all driven wheels of the vehicle.
Figure 6:
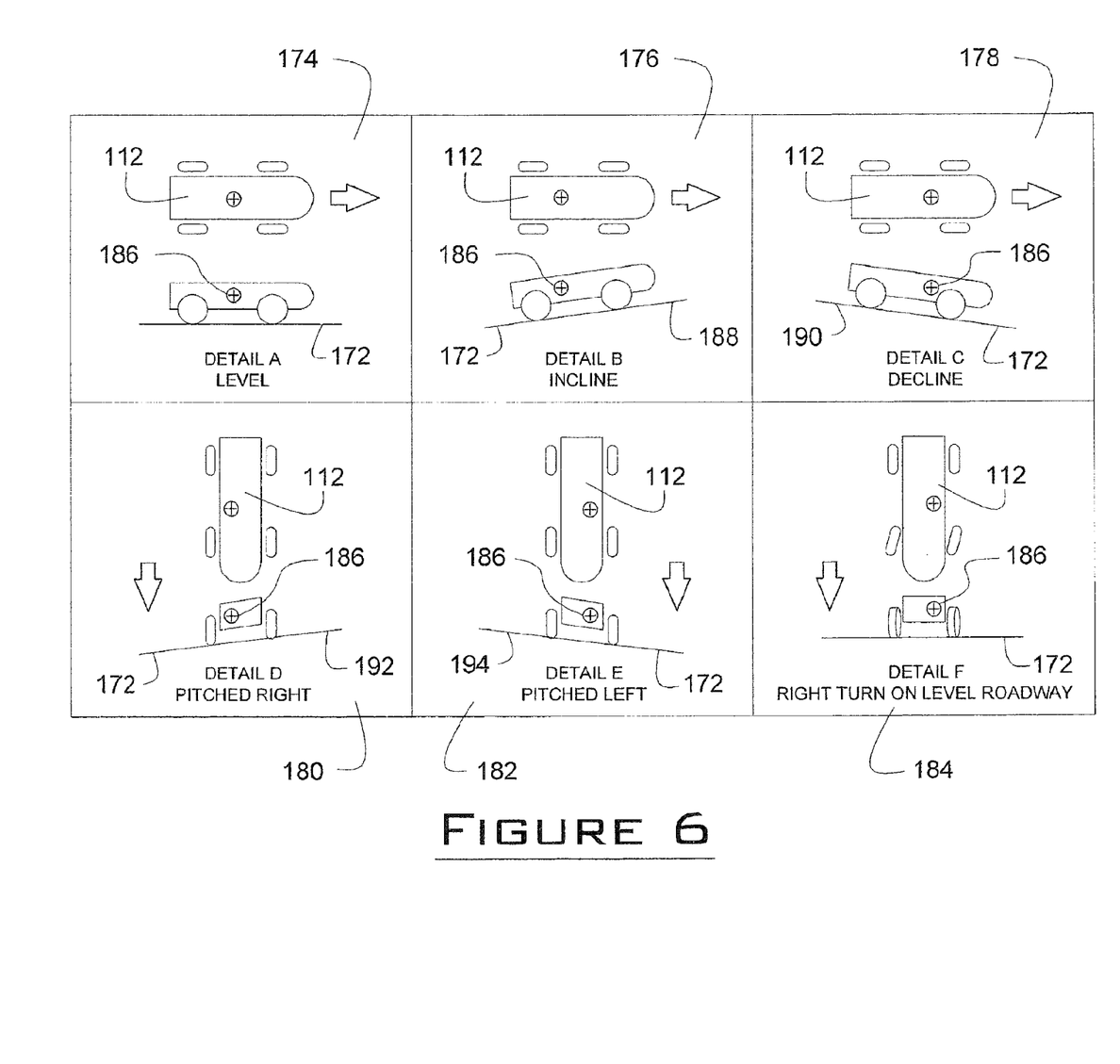
FIG. 6 is a series of schematic illustrations, each of which are representations of the roadway zones illustrated in FIG. 5, showing vehicle orientation during travel through each zone and depicting the general shift of the vehicle center of gravity as well as the general response of the drive control system to these unique power demands.

An intelligent vehicle drive control system 100 is depicted in FIGS. 4-6. The drive control system 100 includes a computer 105, a variable drive controller 106, a drive motor 108 and a gyroscope sensing device 110. The computer 105 includes a dynamic force vector computer software program 102 and a microprocessor 104. The software program 102 is similar to that in function and operation as the dynamic chain pull calculation program 12. The drive control system 100 is integrated with a vehicle 112 which includes typical components for operating on a planet surface 114. It will be appreciated that the present drive control system 100 can be utilized wherever it is desired to dynamically control the movement of a vehicle 112 from place to place.

The control system 100 is operable to have multiple drive systems such as a master drive system 138, a slave drive system 142, and possibly others, so that multiple wheels 124 of the vehicle 112 traverse the planet surface 114. Each drive system 138, 142 has its own wheel and associated components. Based upon environmental conditions, the vehicle may have a number of wheels that may operate in the drive control system 100 at any one given time. The system 100 is flexible in that the vehicle 112 may dynamically engage wheels and disengage wheels based upon desirable operating conditions.

With continued reference to FIG. 4, for a multiple drive configuration, the control system 100 will include a slave drive system 142 which includes a slave variable drive controller 106N, a slave motor 108N that drives a slave gear box 120N, a slave gyroscope 110N, a slave encoder 116N, and a slave drive wheel 124N. It will be appreciated that the control system 100 may include other slave drive systems 142, each of which could have its own slave controller 106N, additional slave motors 108N, other slave gyroscopes 110N, other slave encoders 116N, and other slave wheels 124N, each of which are in communication with the microprocessor 104. Thus, the system 100 may have a number of drive wheels up to the number N and the system 100 is flexible in that it can accommodate the number of wheels based upon desirable working conditions.

With continued reference to FIG. 4, an encoder 116 is placed such as to be driven by the output shaft 118 of a drive gear reducer 120 which is, in turn, driven by the output shaft of the drive motor 108. The encoder 116 has the primary purpose of providing accurate feedback signals 122 to the microprocessor 104 of the control system 100 and is for monitoring the rotational speed of the driven wheel 124.

Through utilization of the encoder 116, the rotational speed of wheel 124 can be synchronized with the rotational speed of the other wheels 124N such that the vehicle 112 travels properly at the direction and speed as determined by the operator. The rotational angle of all encoders is continually measured by increments and is returned to the control system via signals 122 and 122N. These signals 122 and 122N are compared to incremental measurements coming from other drive related encoders 116N within the control system 100. The incoming incremental data 122 is utilized to cause the control system 100 to respond in such a way as to adjust the relative speed of each drive so that the rotational speeds of all wheels 124 and 124N relative to the master drive motor 108 and each other motor 108N remains constant. The synchronizing function of this system 100 in this manner will assure that the vehicle travel is true and consistent with the operator's intent.

A computer 105 includes a microprocessor 104 and software 102 for converting the data from the gyroscope sensing device 110. This data in turn is processed by the microprocessor 104 so as to determine the vehicle 112 attitude and, along with the known weight of the vehicle and its payload as well as the acceleration speed signal 148, forward and reverse direction signal 150 to calculate the overall torque required to move the vehicle 112 in the desired direction and speed. The logic software program 102 is operable to receive the signals 148, 150, 152 and the signals 122 and 140 for each wheel 124, 124N. Operator command input characteristics 154 are provided such as speed control 144, directional control 146 and brake control 156.

It will be appreciated that the microprocessor 104 can individually control the speed adjustments of the slave drive controller(s) 106N. Torque output signal 158 traverses from the microprocessor 104 to the master controller 106. The master controller 106 is designated primarily for "speed reference" purposes as the remaining slave drives 106N will continuously adjust their own speeds to match and speed synchronize with the designated master drive controller 106. The master controller 106 responds to this command by outputting variable voltage 160 and variable frequency (speed and torque) by matching the command output signal 168 from the microprocessor 104. A second torque requirement output signal 158N comes from the microprocessor 104 and is delivered to slave drive controller 106N. Another torque output signal 158N is communicated from microprocessor 104 to another slave drive 106N. It will be appreciated that the present drive control system 100, can include a plurality of slave controllers 106N, slave drive motors 108N, slave driven wheels 124N, slave encoders 116N and slave gyroscopes devices 110N in communication with one another, as deemed necessary in order to make the vehicle 112 operate properly. Thus, the control system 100 is flexible and can be adopted for application in multiple-wheeled AWD vehicles 112 with varying numbers of wheels 124 as designed for various types of all terrain vehicle applications. By contrast fewer controllers 106N and motors 108N can be used and the system 100 automatically adjusts for same. The master drive 138 could be disengaged and the slave drive 140 could become the primary drive source.

The gyroscope sensing devices 110, 110N, send signals 140, 140N, to the microprocessor 104. Said signals carry data identifying the attitude and pitch of the vehicle to the microprocessor 104. Other sensing devices such as transducers T and Tn may be utilized to weigh the payload(s), including individual persons and/or objects on seats and in storage areas of the vehicle. This data is also sent to the microprocessor 104. It is also possible that payload weight data may be manually input prior to travel as a cost saving measure.

All data including vehicle attitude, pitch, gross weight, speed, acceleration, forward and reverse direction, and braking commands is continuously and dynamically conveyed to the microprocessor in real time via signals 122, 140, 148, 150 and 152. The force vector mathematical model software program 102 continually converts the new data to ascertain the torque and speed demand at each operating drive motor, wheel 124, 124N. That information in turn is then compared to the real time current speed and torque of each individual drive motor 108, 108N, in order to ascertain whether each is operating efficiently as calculated by the program 102. In turn, output torque signals 158, 158N are generated from the microprocessor 104 segmented into its constituent parts as calculated from the vehicle's pitch, attitude, and weight distribution properly allocating torque characteristics to each motor and wheel based on the current center of gravity of the vehicle. For example, if it is found that slave motor 108N is lagging, which is when the torque output is not equal to the calculated torque demand, then the microprocessor 104 would send a signal 158N to controller 106N that is indicative of the need to increase power to drive motor 108N.

Thus, a dynamic drive control system 100 is operable so as to allow the overall system to dynamically adjust given current load characteristics on the vehicle 112. Through the use of the dynamic force vector calculation software program 102, constant information is sent via gyroscope sensing devices 110, input devices 144, 146 and 156 to the microprocessor 104, which continuously monitors and updates, the current performance characteristics of the vehicle 112. In turn, information via signals 158 and 158N automatically adjusts the performance of the motors 108, 108N to a desired level.

With reference to FIG. 5, a schematic diagram 170 is illustrated of the plan view of a series of vehicles 112 with the novel drive control system 100 on an example roadway 172. The roadway 172 is divided into six zones. Each zone represents in order: a level area of roadway 174, an inclined section of roadway 176, a declined section of roadway 178, a level area pitched to the right 180, a level section of roadway pitched to the left 182, and a curved section of level roadway 184. The vehicle 112 is shown at these progressive positions moving in the intended direction of travel at the various locations along the roadway 172 such that the vehicle attitude and/or pitch at the time and position follows the attitude and pitch of the roadway.

The first Zone 174, see FIG. 6A, includes the portion of the roadway 172 where the vehicle is on a level section of a roadway. For purposes of this example we can assume that the center of gravity 186 of the vehicle 112 is at the center of the vehicle equally distributing the load to all four wheels, as shown in the detail of FIG. 6A. At this point, the computer 105 accepts data inputs from the gyroscope 110, 110N indicating that the vehicle 112 is level and additional data from the wheel encoders 116, 116N that it is moving at the desired speed and, therefore, the torque output command to each wheel 124, 124N remains equal and constant.

As the vehicle 112 enters the second Zone 176, see FIG. 6B, its front wheels begin to travel up the incline 188 gradually bringing the entire vehicle base to the incline angle when the rear wheels reach the inclined part of the roadway 172. The vehicle center of gravity 186 shifts toward the rear of the vehicle 112 and this load transition is recognized by the microprocessor 104 and the torque output of each drive 106, 106N is modified accordingly as described above. The load transition is recognized because the gyroscope sensing device 110 senses a shift on the rear of the vehicle 112 thus transmitting a signal 140 to the computer 105 which in turn causes the drive controllers 106, 106N to react accordingly. In this scenario, the front wheels may receive less torque and while more torque may be exerted from the rear wheels which will have maximum traction during an incline condition.

As the vehicle 112 enters the third Zone 178, see FIG. 6C, its front wheels begin to travel down the decline 190 gradually bringing the entire vehicle base to the decline angle when the rear wheels reach the declined part of the roadway 172. The vehicle's 112 center of gravity 186 also shifts toward the front of the vehicle 112 and this load transition is recognized by the microprocessor 104 and the torque output of each drive member or wheel 124, 124N is modified accordingly. In this case the torque control response will be to provide braking torque so that the vehicle 112 maintains its desired speed instead of increasing its speed while descending the decline. The gyroscope sensors 110, 110N will operate to sense the downward condition and send a resulting signal 140, 140N to the microprocessor 104.

As the vehicle 112 enters the fourth Zone 180, see FIG. 6D, the roadway 172 is pitched 192 to the right, and the vehicle's 112 body follows the pitch angle to the right while in this zone of the roadway 172. The vehicle's center of gravity 186 also shifts toward the right side of the vehicle 112 and this load transition is recognized by the microprocessor 104 and the torque output of each drive 106, 106N is modified accordingly resulting in greater torque being applied to the right front and rear wheels of the vehicle 112 in order to offset the increased torque demand imposed by the movement of the vehicle's center of gravity 186 to the right. The gyroscope sensors 110, 110N will operate to sense the right shifting condition and send a resulting signal 140, 140N to the microprocessor 104.

As the vehicle 112 enters the fifth Zone 182, see FIG. 6E, the roadway 172 is pitched to the left, and the vehicle's 112 body follows the pitch angle to the left 194 while in this zone of the roadway. The vehicle's center of gravity 186 also shifts toward the left side of the vehicle and this load transition is recognized by the microprocessor 104 and the torque output of each drive 106, 106N is modified accordingly resulting in greater torque being applied to the left front and rear wheels of the vehicle in order to offset the increased torque demand imposed by the movement of the vehicle's center of gravity to the left. The gyroscope sensors 110, 110N will operate to sense the left shifting condition and send a resulting signal 140, 140N to the microprocessor 104.

As the vehicle 112 enters the sixth Zone, see FIG. F, the roadway 172 turns to the right. The vehicle's 112 steering mechanism may be monitored such that when executing a turn, the vehicle's shifting center of gravity 186 may be calculated based on all motion factors as the vehicle turns to the right while in this zone of the roadway 172. The vehicle's center of gravity also shifts toward the left side of the vehicle and this load transition is recognized by the microprocessor 104 and the torque output of each drive 106, 106N is modified accordingly resulting in greater torque being applied to the appropriate vehicle wheels in order to keep the vehicle 112 stable in the turn.

In each case described above with the exception of the vehicle 112 turning while in a flat plain, the gyroscope sensing device responds to the change in vehicle attitude and/or pitch and sends the corresponding data to the microprocessor 104. In the case of the vehicle 112 turning on a flat plain, the data utilized by the microprocessor 104 to calculate the center of gravity would not only include the gyroscope 110, but would also take into account only the vehicle's speed and severity of the turn to make torque adjustments to the individual drive motors. The microprocessor 104, combining this data with the encoder feedback speed signals 122, calculates the torque that is needed at each drive wheel 124, 124N, utilizing the force vector model software program 102 which is inclusive of the present weight (mass) of the vehicle.

It will be appreciated that a "vehicle" 112 may be made up of a segmented group of attached vehicle frames, each of which includes its own separate drive mechanisms 138, 142 and gyroscope sensing devices 110, 110N. A central microprocessor 104 would accept either direct inputs and feedback from each drive segment or inputs relayed from on board microprocessors via network connections also included with each segment. This would allow for an efficient all terrain military vehicle, explorer or "moon rover" type vehicle. The microprocessor(s) would gather similar gyroscopic data, encoder feedback, and deliver appropriate torque and speed commands to each drive mechanism as needed to move the cluster of attached drive segments in a desired direction and a desired speed.

The physical arrangement of a segmented group of attached vehicle frames could vary a great deal. Each separate frame contains its own drive system which in turn, could be made up of one or more drive mechanisms as described herein. For example, one frame could be made up similarly to a conventional vehicle with four wheels. This unit could be "hitched" or connected to one or more similar four wheeled vehicles in tandem, say three tandem vehicles. Each frame would have its own on-board gyroscope that would determine each frame segment's vector attitude at any point in time. On board the "master" vehicle would be a central microprocessor receiving data from all three tandem vehicles and process the data such that all units are acting in a coordinated fashion to deliver power to each separate segment such that all connected segments operate to move the train of vehicles as commanded by the "master" frame segment. Depending on specific tasks that the grouping of segments may be designed to perform, each frame may be made up of as few as one drive wheel or as many additional drive wheels as needed. These units could be configured to operate individually when needed or in a group when needed. Tandem vehicles as described above could work as freight haulers or other types of delivery mechanisms. Whereas, specialized single wheeled vehicles could be attached to each other such that a group of two or more could provide coordinating driving torque to move over difficult terrain. If specialized frameworks were adapted such that these single modular units could be flexibly attached to the front, rear, and sides of other similar vehicles, the grouping could move over difficult terrain in a manner similar to the motion one might imagine if you were to observe several "hovercraft" attached together moving over a hilly area. At any one time, one or more of the hovercraft may be moving up an incline while others were moving down declines while yet others were moving through a relatively flat area, having the quality of a long (or wide) centipede moving over obstacles in its path.

It will also be appreciated that other sensing devices could be added to a vehicle that would allow the vehicle to sense immediate terrain consistency, moisture levels, as well as wind direction and speed, and cause the microprocessor to adjust wheel torque and speed to accommodate immediate road conditions. In addition, other sensing devices may be added that could recognize obstacles and cause the microprocessor 104 to override the drive commands and either change direction or stop the vehicle's motion as a result.

It will also be appreciated that the unique drive control system may be controlled manually from a local driver operated mechanism positioned on the vehicle or from a remote controller point capable of outputting speed, acceleration, and directional commands so as to be received by an on-board control unit that, in turn, delivers the command signal group to the central control microprocessor on board.

It will also be appreciated that that this vehicle drive system 100 can be programmed to accept acceleration commands so as to deliver the vehicle 112 to the speed required in a manner consistent with the most efficient battery power delivery calculations in order to save the energy availability from the power source.

It should be noted that the gear reducers 120 shown on FIG. 1 may not be needed depending on the power and speed requirement demand of a particular vehicle design. This may be particularly true of very low speed vehicle designs such as golf carts or specialized all terrain vehicles such as "moon rovers".

A description of the operation of the drive control system 100 will now be presented. With references to FIGS. 4-6, one aspect of the present invention includes an operation of an AWD vehicle in a variety of terrain and environments to include any planet surface where Newton's second law of motion may be applied. A vehicle 112 can be configured with the described unique drive system 100 and in various forms that may be similar to conventional four wheeled single framed passenger vehicles or more exotic segmented or tractor type vehicles with many drive wheels including moon-rover type exploration vehicles. In each configuration, the primary engine that calculates the power and torque outputs is an elaboration of Newton's second law of motion which may be simply expressed as F=ma (Force equals mass times acceleration). The calculations are continually made during travel with the assumption that the weight or mass of the vehicle and its payload is known and expressed as a constant. This weight constant is included along with the variable (a) acceleration expressed as a command or goal by the vehicle's operator. The primary sensing device, the on-board gyroscope, provides an additional variable which describes the angle of attitude of the vehicle during travel. It is utilized to generate the vector aspect of Newton's mathematical model impacting the mass calculation and effectively completing the basic power calculation of total Force or Torque/Power needed to move the vehicle as desired. Other system constants and variables to include machine overall friction factors and the calculated movement and location of the vehicle Center(s) of Gravity is further utilized to refine individual motor wheel torque and speed adjustment outputs to overcome various power problems inherent in random travel over various terrains.

The software program 102 utilizes the incoming sensed informational data 122, 122N, 140, 140N and the command signals 148, 150 and 152 from the operator to determine the total power needed and deliver individual commands to all motors resulting in successful movement of the vehicle 112 at the speed and direction desired by the operator. The data is continually processed in real time to include actual performance feedback such that a delta will now be recognized indicating the difference between the actual performance and the preferred bench mark performance as desired by the operator. The dynamic vector force calculation software program 102 processes this condition and automatically adjusts via controllers 106, 106N the performance of the system 100 to make it closer to the bench mark performance level.

It will be appreciated that the drive system 100 includes a provision for a clutch mechanism 118, 118N that is operable to disconnect any of the individual drive motors 108, 108N and their associated reducers 120, 120N from the driven wheel 124, 124N. This action can be performed manually or, via signals 198, 198N from the computer 105 where in the case of a pre-programmed recognition of a condition warranting or necessitating the disengagement of one or more active drive modules. When this "free-wheeling" condition is detected, the remaining engaged drives will automatically compensate and provide additional torque as needed to comply with speed and vector commands. It will also be noted that it may be beneficial for the drive control system 100 to automatically disengage and re-engage individual or groups of drives on-the-fly when the work of moving the vehicle 112 is calculated to be performed more efficiently if certain wheels are free-wheeling while others remain engaged.

Through this unique vehicle drive control system 100, the drive motors 108, 108N can be disengaged for maintenance, or other purposes, while in operation. When this condition is detected, the other associated motors 108N within the system 100 will automatically adjust under dynamic conditions and increase their performance as to accommodate for the missing motor. Further, the master drive motor 108 could be taken out of service and one of the slave drive motors 108N could be designated, either manually or automatically, as the new master drive. Likewise, the former master drive 108 could be designated as a slave drive 108N as desired when it is brought back into service. Thus, the drive control system 100 is flexible in that slave and master motors can be interchanged and the microprocessor 104 may operate to control or effectuate said changes.

It will be noted that a motor brake 196, 196N connected to the motor's double extended shaft may be included in the design configuration of the vehicle 112. A control signal 168, 168N may be produced to engage a brake 196, 196N and lock the motor 108, 108N and gear reducer 120, 120n during periods of time when the associated wheel is caused to "freewheel". This will act to stabilize the motor and reducer during travel and prevent potential subsequent wear or damage to the mechanism due to vibration.

Another aspect of the operation of the present invention includes monitoring the rotational speed of all wheels 124, 124N, and comparing the speed of each to the target speed determined by the Dynamic Force Vector Software Program 102. If an inordinate amount of wheel slip (increase relative to target) is detected via sensor encoder 116 relative to a target metric, then the rotational speed may be slowed until traction (torque resistance equilibrium) is reached.

It should be noted that this invention is applicable to vehicle systems with single drive control units. It should also be noted that this control system 100 applies to other forms of power application systems to include those based on an internal combustion engine as the primary power source. Power distribution and torque application at individual wheels may be transferred via mechanical means such as transmissions or torque convertors as directed by the central mathematical model.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

The invention claimed is:

1. A drive control system for a vehicle comprising:
   a vehicle for carrying a pay load that is operable to move and that is propelled by at least one drive motor;
   a computer for processing data;
   a dynamic mathematical model calculation program executed by said computer, said program being operable to continuously evaluate the torque requirements of the system and produce a signal responsive of actual torque demands;

a variable drive motor controller in communication with the computer, said controller is operable to receive input data from the computer and deliver torque and speed power outputs to a motor;

a drive motor operable to receive the torque and speed power outputs and provide power to a primary moving element of said system; and a gyroscopic sensor and encoder for sensing operating conditions and providing signals to the computer.

2. The drive control system as claimed in claim 1, further comprising speed and directional command signals being input to the computer.

3. The drive control system as claimed in claim 1, wherein the vehicle is automatically adjusted to perform at different levels based on varying conditions.

4. The drive control system as claimed in claim 1, further comprising a slave variable drive motor controller that produces a torque output signal to a slave drive motor.

5. The drive control system as claimed in claim 1, further comprising a gear reducer that is connected to the drive motor.

6. The drive control system as claimed in claim 1, wherein the computer continuously calculates actual torque requirements for each motor and produces a signal to the variable drive control indicative of torque needed.

7. A drive control system for a vehicle comprising:
a vehicle body that is operable to move a payload;
a computer on board the vehicle body, the computer is operable to process data;
a dynamic force vector software program executed by said computer, said program being operable to continuously evaluate the torque requirements of the system and produce a signal that is responsive of actual torque demands;
a variable drive controller in communication with the computer, said controller is operable to receive input data from the computer and deliver torque and speed output to a motor;
a motor operable to receive torque and speed outputs from the variable drive controller, said motor provides power to a driven member; and
a gyroscope sensing device that is operable to sense the terrain conditions in which the vehicle is operating, said gyroscope sensing device produces a signal that is relayed to the computer.

8. The drive control system as claimed in claim 7, further comprising a plurality of variable drive controls that each communicate with their own drive motor, each drive motor responds in accordance with a torque output signal generated from the dynamic force vector program.

9. The drive control system as claimed in claim 8, wherein the computer provides a torque output signal to each variable drive control, said torque output varies in accordance with dynamic run conditions of the vehicle.

10. The drive control system as claimed in claim 7, wherein said system continuously monitors the current operating conditions of the vehicle and the variable drive controller adjusts torque output demands.

11. The drive control system as claimed in claim 7, wherein the computer is operable to receive signals that are of the speed, acceleration or directional type.

12. The drive control system as claimed in claim 7, further comprising another variable drive controller that is operable to produce a torque signal to a another motor that in turn propels another driven member.

13. The drive control system as claimed in claim 7, further comprising a plurality of slave motors that are each controlled by the computer, each slave motor imparts motion to its own wheel, said computer is operable independently control each wheel based on sensed conditions.

14. The drive control system as claimed in claim 7, further comprising an encoder that monitors the operating condition of the driven member, said encoder provides a signal to the computer and the software program considers said signal.

15. A drive control system comprising:
a vehicle configured to move a payload;
a computer for processing data;
a gyroscopic sensor configured to provide a vector to the computer;
a dynamic force software program executed by said computer, said program being operable to continuously evaluate the torque requirements of the system and produce a signal responsive of actual torque demands based on the vector;
a variable drive controller in communication with the computer, said controller is operable to receive input data from the computer and deliver torque and speed power outputs to a motor based on the vector; and
a motor operable to receive the torque and speed power outputs and provide power to a wheel.

16. The drive control system as claimed in claim 11, wherein the wheel is connected to a vehicle, said drive control system is operable to adjust torque requirements based on changing dynamics of the system.

17. A method of operating a drive control system for a vehicle comprising:
a. providing a vehicle configured to move a payload, at least one motor and at least one control system;
b. calculating a base line torque requirement for each motor in the system;
c. sensing, with a gyroscopic sensor, dynamic conditions on the vehicle including a vector of the vehicle and creating signals;
d. sending signals to a computer that hosts a dynamic calculation program;
e. processing said signals with said program in order to adjust torque requirements for each motor based the vector of the vehicle; and
f. adjusting at least one of said motors as determined by the program.

18. The method of operating a drive control system as claimed in claim 17, wherein the step of sensing dynamic conditions includes sensing the terrain conditions in which the vehicle resides, producing a signal indicative of the sensed terrain condition, and the program processing said signal to adjust performance of said motor.

19. The method of operating a drive control system as claimed in claim 17, further comprising at least two motors and the step of taking one of the motors off line while at least one remaining motor in the system takes over and drives the vehicle.

20. The method of operating a drive control system as claimed in claim 17, further comprising the step of providing input signals such as one of speed, direction, slippage or terrain.

* * * * *